(12) United States Patent
Elwood

(10) Patent No.: US 7,447,885 B2
(45) Date of Patent: Nov. 4, 2008

(54) READING PREDICTION OUTCOMES WITHIN A BRANCH PREDICTION MECHANISM

(75) Inventor: Matthew Paul Elwood, Austin, TX (US)

(73) Assignee: ARM Limited, Cambridge (GB)

( * ) Notice: Subject to any disclaimer, the term of this patent is extended or adjusted under 35 U.S.C. 154(b) by 118 days.

(21) Appl. No.: 11/109,956

(22) Filed: Apr. 20, 2005

(65) Prior Publication Data

US 2006/0242392 A1 Oct. 26, 2006

(51) Int. Cl.
*G06F 9/00* (2006.01)
(52) U.S. Cl. .................. 712/240; 712/238; 712/239
(58) Field of Classification Search .................. 712/233, 712/234, 235, 236, 237, 238, 239, 240
See application file for complete search history.

(56) References Cited

U.S. PATENT DOCUMENTS

| | | | | |
|---|---|---|---|---|
| 4,943,908 A | * | 7/1990 | Emma et al. ................. | 712/240 |
| 5,687,360 A | * | 11/1997 | Chang ......................... | 712/240 |
| 5,901,307 A | * | 5/1999 | Potter et al. ................. | 712/240 |
| 5,935,241 A | * | 8/1999 | Shiell et al. ................. | 712/240 |
| 6,823,446 B1 | * | 11/2004 | Sinharoy ..................... | 712/239 |
| 7,203,825 B2 | * | 4/2007 | Hum et al. ................... | 712/239 |

OTHER PUBLICATIONS

Related U.S. Appl. No. 11/109,957, filed Apr. 20, 2005, Elwood.
Related U.S. Appl. No. 10/994,179, filed Nov. 22, 2004, Elwood.
Related U.S. Appl. No. 11/095,655, filed Apr. 1, 2005, Elwood et al.
Related U.S. Appl. No. 11/121,184, filed May 4, 2005, Elwood et al.

* cited by examiner

*Primary Examiner*—Eddie P Chan
*Assistant Examiner*—Jacob Petranek
(74) *Attorney, Agent, or Firm*—Nixon & Vanderhye P.C.

(57) ABSTRACT

A branch prediction mechanism includes a history value register storing a history value which is used to address into a history buffer from which a plurality of prediction values are read and stored into a prediction value store. The one or more prediction values to be used with a potential branch instruction are selected from the prediction values store using a multiplexer switched by a branch predicting portion of a fetch address. The history buffer is only read when the history value changes whereas the prediction values store is read each time a potential branch instruction is identified requiting a prediction value to be associated with it. The reduced duty cycle of the history buffer saves power.

14 Claims, 2 Drawing Sheets

READING PREDICTION OUTCOMES WITHIN A BRANCH PREDICTION MECHANISM

FIELD OF THE INVENTION

This invention relates to data processing systems. More particularly, this invention relates to branch prediction mechanisms within data processing systems which seek to predict whether or not a branch program instruction will or will not result in a branch being taken and accordingly redirect instruction fetching before the actual execution outcome of the branch instruction is known.

BACKGROUND

It is known to provide branch prediction mechanisms which seek to predict whether or not branch instructions will or will not result in a branch being taken (i.e. a non-sequential change in program instruction fetch address) and direct the instruction fetching accordingly. Within pipelined systems the consequences of mispredicting a branch are significant as the pipeline must be flushed before instructions fetched from the correct fetch address can be executed.

Various techniques are known for predicting branch outcomes and these include mechanisms which store a history value indicating the branch outcomes of a preceding sequence of branch instructions which have been encountered and use this history value to index into a branch history buffer storing a prediction for the branch outcome of a newly encountered branch instruction. The previous branch history as characterised by the stored history value is a way of identifying a newly encountered branch instruction by correlating it with previously encountered branch behavior and storing a predicted outcome which can be used for the newly encountered branch instruction. Branch history values are not unique to a particular branch instruction (different branch instructions having the same history value is known as aliasing) and accordingly in order to improve the differentiation between branch instructions encountered it is known to logically combine a history value of preceding outcomes with bits of the fetch address for the newly encountered branch instruction in order to index the branch history buffer. This increases the likelihood that branch instructions which share a common history value may nevertheless be differentiated by virtue of differing fetch addresses and accordingly separate prediction values for those different branch instructions can be stored and accessed.

There is a general requirement within data processing systems to reduce the amount of power consumed in operation. Whilst branch prediction mechanisms are effective in improving processing performance, the operation of these mechanisms consumes power. Reducing power consumption is advantageous for a number of reasons, including increasing battery life in portable devices, allowing lower temperature operation, reducing power loading within the integrated circuit and the like.

SUMMARY

Viewed from one aspect the present invention provides apparatus for processing data under control of program instructions including branch instructions, said apparatus comprising:

a memory operable to store said program instructions;

a fetch unit operable to fetch program instructions from respective fetch addresses within said memory, each fetch address including a prediction selecting portion;

at least one history register operable to store a history value indicative of a pattern of preceding branch outcomes corresponding to whether a preceding sequence of branch instructions fetched from said memory respectively have taken or not taken branch outcomes;

a history buffer operable to store for each history value a plurality of prediction values giving predictions of branch outcomes for branch instructions preceded by a sequence of branch instructions corresponding to said history value and having respective prediction selecting portions; and a prediction values store operable to store a plurality of prediction values corresponding to a current value of said history value; wherein when said history value is changed, said plurality of prediction values are read from said history buffer and stored in said prediction values store; and when a potential branch instruction is fetched from a fetch address in said memory, one or more prediction values including a prediction value to be used for said potential branch instruction and corresponding to a prediction selecting portion of said fetch address is read from among said plurality of prediction values stored in said prediction values store, such that if said history value does not change, then prediction values for different potential branch instructions having different prediction selecting portions within their fetch address are read from said prediction values store without requiring a read from said history buffer.

The inventor recognized that the fetch address of potential branch instructions for which predictions are to be made generally changes more frequently than the history value characterizing the branch outcomes of previously encountered branch instructions. The fetch address changes with each fetch, whereas each fetch need not contain a branch which will change the history value. Furthermore, there may be a lag between a branch being fetched and when it is used to update the history value. Using a portion of the fetch address (a prediction selecting portion) in combination with the history value to select a prediction helps reduce the aliasing problems of using the history value alone. Thus, for a given history value several predictions may be made based upon different fetch addresses. The present technique exploits this difference in how frequently the history value and prediction selecting portion of the fetch address change by reading the multiple prediction values corresponding to a history value when the history value changes and storing these multiple values in a prediction values store from which separate individual prediction values to be used can be selected and read based upon the fetch address alone. Thus, the power consumed in reading the history buffer is reduced (e.g. in typical simulations the duty cycle for reading of the history buffer is reduced from 60-50% to 30-15%).

It will be appreciated that there could be different branch instructions that had common history values and common prediction selecting portions of their addresses; these would be aliased.

It will be appreciated that the portion of the fetch address used to provide additional discrimination between branch instructions could be taken from different positions within the fetch address. Advantageous embodiments are ones in which said fetch addresses are X-bit addresses with bit positions extending from a lowest order bit $0$ to a highest order bit $(X-1)$, said instructions being fetched in blocks having a length of $2^N$ bytes and said fetch addresses including a low order bit portion extending from bit $0$ to bit $(N-1)$, a prediction selecting portion extending from bit N to bit M and a high order bit portion extending from bit $(M+1)$ to bit $(X-1)$. It will be appreciated that not all instruction sets are byte-atomic and accordingly not all of the lowest order bits of the fetch address need factor into the indexing. As an example, for ARM/Thumb instructions the smallest of these are a halfword (16-bits) in size and accordingly in this example the fetch addresses are 31:1

The use of the portion of the fetch address above the block fetch size and yet toward the lower order end of the fetch address yields a fine grained differentiation between fetch addresses which may not be widely spaced and which are likely to be fetched in sequence whilst avoiding seeking to differentiate between addresses which are likely fetched within a single block of bytes. It is likely that the fetch addresses will be sequentially stepped through making the reading and storage of multiple predictions worthwhile. Sequential addresses will differ in these bits. In addition to or alternatively to, the lower address bits in the range of bits 0 to (N−1) can provide greater advantage when the number of instructions per fetch is high in order to differentiate between multiple branches in a single fetch. This also generally reduces aliasing for fetching that have identical upper address portions (X−1:M+1), but with branches that fall at different places within the given fetches.

Advantageous embodiments utilize values of N=3, X=32 and M=4.

A multiplexer may advantageously be used to select the prediction value to be used from among the plurality of prediction values stored within the prediction values store. The multiplexer may be switched by the prediction selecting portion of the fetch address. The prediction can also take account of the position of the predicted branch within a fetched block of instructions (e.g. size $2^N$) by using tag information (e.g. as stored in a branch target buffer) to identify the predicted branch position with the block (e.g. its position within address bits 0 to N−1).

The history buffer is advantageously arranged to store for each history value a number of stored values corresponding to the number of prediction values stored for each history value, the stored values being addressed by a common history value.

Viewed from another aspect the present invention provides a method of processing data under control of program instructions including branch instructions, said method comprising:

storing said program instructions in a memory;

fetching program instructions from respective fetch addresses within said memory, each fetch address including a prediction selecting portion;

storing at least one history value indicative of a pattern of preceding branch outcomes corresponding to whether a preceding sequence of branch instructions fetched from said memory respectively have taken or not taken branch outcomes;

in a history buffer, storing for each history value a plurality of prediction values giving predictions of branch outcomes for branch instructions preceded by a sequence of branch instructions corresponding to said history value and having respective prediction selecting portions; and in a prediction values store, storing a plurality of prediction values corresponding to a current value of said history value; wherein when said history value is changed, said plurality of prediction values are read from said history buffer and stored in said prediction values store; and when a potential branch instruction is fetched from a fetch address in said memory, one or more prediction values including a prediction value to be used for said potential branch instruction and corresponding to a prediction selecting portion of said fetch address is read from among said plurality of prediction values stored in said prediction values store, such that if said history value does not change, then prediction values for different potential branch instructions having different prediction selecting portions within their fetch address are read from said prediction values store without requiring a read from said history buffer.

The above, and other objects, features and advantages will be apparent from the following detailed description of illustrative embodiments which is to be read in connection with the accompanying drawings.

DETAILED DESCRIPTION

Figure 1:
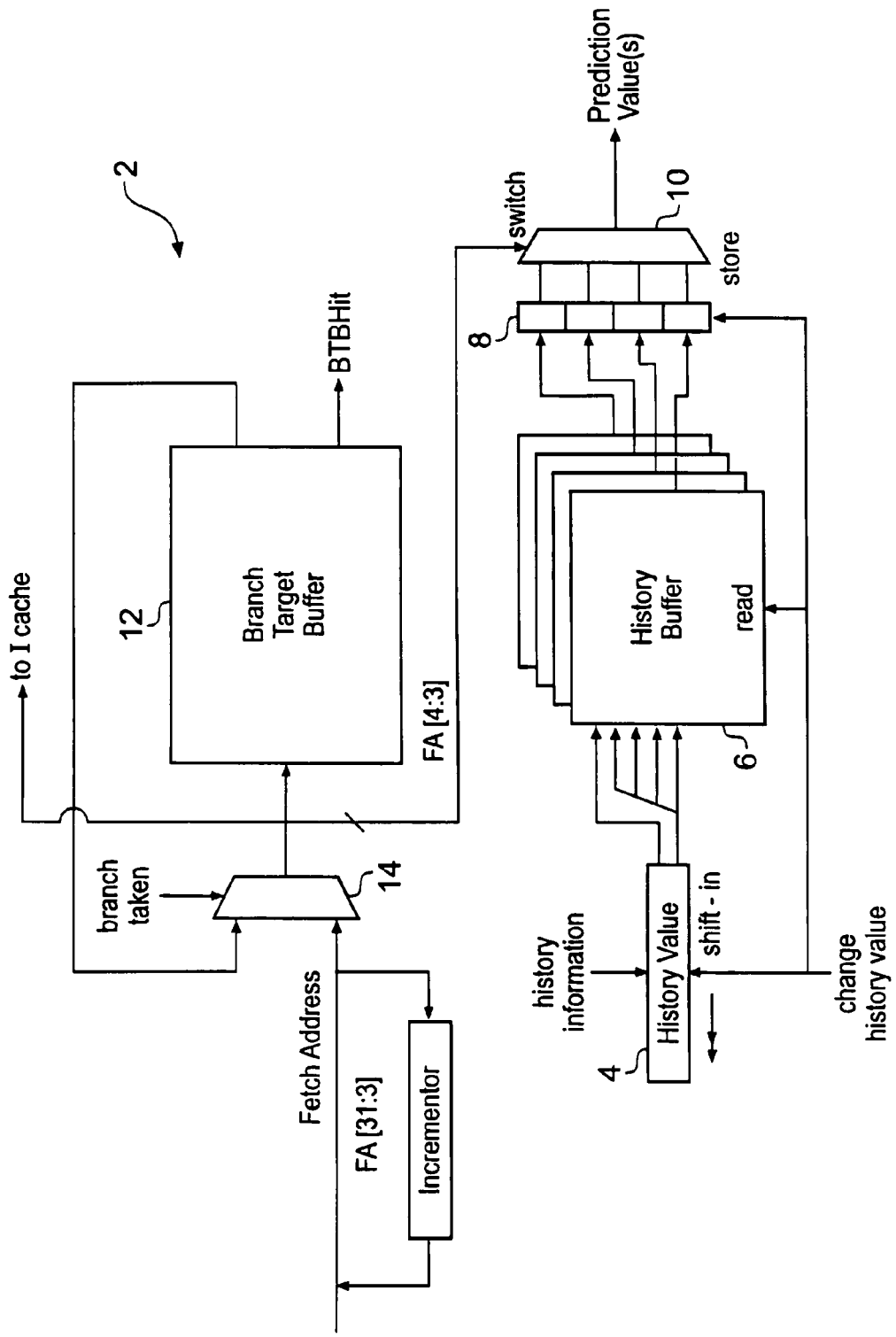
FIG. 1 schematically illustrates a branch prediction mechanism for use within a data processing apparatus executing program instructions including branch instructions.

FIG. 1 illustrates a portion of a branch prediction mechanism 2. It will be appreciated by those in this technical field that such a branch prediction mechanism 2 is only one part of a data processing apparatus which will include a large number of additional components. It will further be appreciated that the branch prediction mechanism 2 illustrated in FIG. 1 could include further components and elements. The branch prediction mechanism 2 illustrated in FIG. 1 shows those portions most relevant to the present technique.

As illustrated, a history value register 4 (embodiments using a plurality of local history value registers are also suitable for use with the present technique and are encompassed herein) stores a history value which is used to address a history buffer 6 storing prediction values indicative of whether or not a particular branch instruction encountered in the program flow as characterised by the pattern of branch outcomes (which may be predicted outcomes or architectural outcomes) for a preceding sequence of branch instructions (these may be immediately preceding branch instructions or a preceding sequence separated by one or more intervening branch instruction from the current potential branch instruction) together with the fetch address associated with the encountered branch instruction will or will not be taken. The history buffer 6 is addressed and read each time the history value stored within the history register 4 changes. The history buffer 6 stores for each history value a number of stored values corresponding to the number of prediction values stored for each history value, the stored values being addressed by a common history value. Thus, the history buffer 6 is read and the multiple values stored within a prediction values store 8. In this example embodiment the prediction values store 8 is shown as a latch but it will be appreciated that this could take a variety of other forms.

The prediction value store operates such that the plurality of prediction values read from the history buffer 6 are persistent and may be selected for output using a multiplexer 10. The history buffer 6 is only read when the history value within the history register 4 changes. The one or more prediction values which include the prediction value which will be used with the branch instruction if correctly identified are selected from among the larger number of prediction values which are stored within the prediction value store 8. The multiplexer 10 is switched by a prediction selecting portion of a fetch address FA associated with the block of bytes which have been fetched from memory and which include the potential branch instruction. The particular bits of the fetch address FA used are bits [4:3] in this example. In a simple embodiment a single prediction value is selected and output by the multiplexer 10 from the prediction value store 8. However, in more sophisticated embodiments a plurality of prediction values, still being a subset of those within the prediction value store 8, is selected for output and may be subject to further processing until the final prediction value which is actually to be employed is determined.

A fetch address FA specifies a block of bytes (e.g. 64-bits such as may include two 32-bit instructions, four 16-bit instructions, etc.) that is fetched. This fetch address is looked up within a branch target buffer 12 and a hit within this branch target buffer 12 indicates that a branch instruction was previously encountered within the block of instructions matching the currently used fetch address FA. A tag field within the BTB can be used to indicate the position of the predicted branch instruction within the block. The stored tag field is used to further select the prediction; the system first selects M:N based upon FA [4:3] and then sends multiple predict bits to the BTB, which uses the stored tag field indicating the position of the branch(es) within the fetch to select the final prediction. (An alternative to the use of the BTB would be to perform a partial decode of the fetched instructions to identify branches). It will be appreciated that the portion of the fetch address compared within the branch target buffer 12 need not be the full fetch address and will typically be a portion of this selected to match the block size. For program instructions within the fetched block of bytes which have hit within the branch target buffer 12 a prediction needs to be made as to whether or not they should be treated as taken or not taken branches such that further fetching can take place in accordance with this prediction. Thus, when a branch target buffer 12 hit occurs, this triggers a prediction value output (or derived) from the output of the multiplexer 10 to be read and used to determine whether or not the identified potential branch instruction should be treated as taken or not taken. When such a potential branch instruction is to be treated as taken, then the multiplexer 14 selects the branch target address stored within the branch target buffer 12 in association with the portion of the fetch address which generated the hit and feeds this back as the next fetch address to be used. The fetch address currently being used is also supplied to the instruction cache which stores the instructions and is used to read the appropriate instructions to be accessed from the instruction cache and fed to the rest of the instruction pipeline.

It will be appreciated that the predictions being performed in FIG. 1 take place early in the instruction pipeline based upon the fetch address of blocks of bytes being fetched into the pipeline together with previous behavior associated with instructions fetched from those addresses and this is used to identify potential branch instructions before those branch instructions can actually be positively identified by appropriate full decoding. (As an alternative an early partial decoding could be performed to identify branches). Thus, the speculative predication made by the mechanism of FIG. 1 will subsequently be confirmed or otherwise when the instructions have been suitably decoded and indeed when they ultimately have been executed and it has been architecturally determined whether or not those branch instructions are or are not taken. The actual outcomes can then be fedback into the data characterizing the historical behavior and correct any speculative updates to that data in accordance with known branch prediction mechanism techniques.

It would delay the prediction if the history buffer was only read after a hit had been identified in the branch target buffer 12. Accordingly, it is normal for the history buffer to be read in parallel with the branch target buffer 12. This wastes power since both arrays would be accessed for each fetch, and the same prediction data would be returned multiple times for fetches with identical history values. Accordingly, in accordance with the current embodiment power is saved by reading all of the prediction. values associated with a particular history value and storing these within a prediction values store 8 from which a selection can then be made based upon the prediction selecting portion FA [4:3] of the fetch address. Compared to an embodiment in which the history buffer with every branch target buffer 12 read, the duty cycle of the history buffer reads can be reduced from 60-50% to 30-15%, which yields an advantageous reduction in power consumption of the system.

Figure 2:
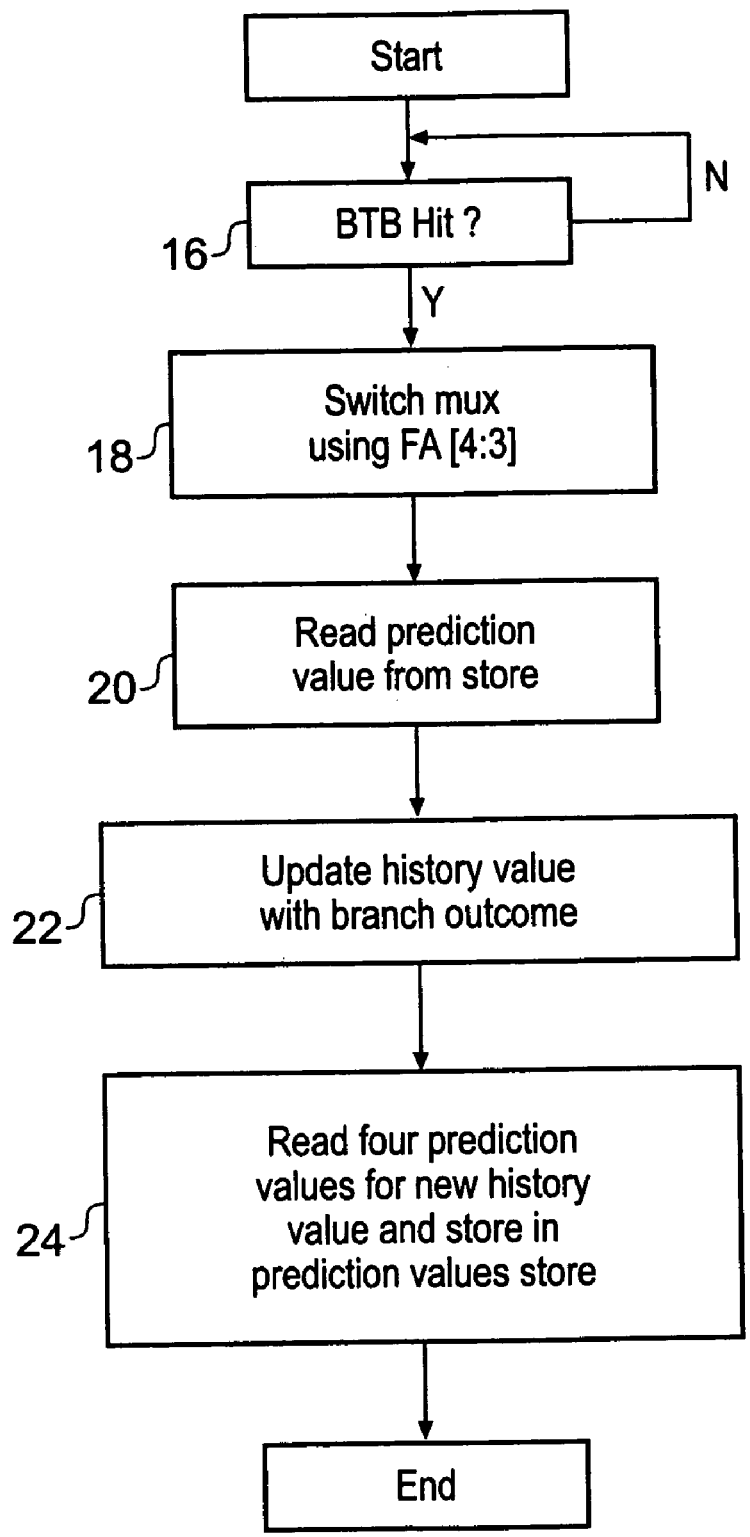
FIG. 2 is a flow diagram schematically illustrating the action of the branch prediction mechanism of FIG. 1.

FIG. 2 is a flow diagram schematically illustrating operation of the circuit of FIG. 1. It will be appreciated that the flow diagram of FIG. 2 necessary serializes the operation illustrated whereas those skilled in this technical field will realize that such operations often occur in parallel and with different control relationships. At step 16, the system waits for a branch target buffer hit to occur. When such a branch target buffer hit occurs, then step 18 switches the multiplexer 10 associated with the prediction values store 8 to select one or more prediction values including the prediction value ultimately to be used for the potential branch instruction. This reading of the prediction values occurs at step 20.

Step 22 updates the history value with the predicted branch outcome. This history value may be corrected later during branch resolution if necessary. The history value is updated based upon a combination of BTB hits and instruction decode as is described in co-pending U.S. patent application Ser. No. 10/994,179 the disclosure of which is incorporated herein by reference. Step 24 uses the change in the history value to also trigger reading of the history buffer 6 to read all of its ways and store the prediction values from all of the ways into the prediction value store 8 from where the prediction values may be selected in dependence upon the prediction selecting portion FA [4:3] of the fetch address.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data under control of program instructions including branch instructions, said apparatus comprising:

a memory configured to store said program instructions;

a fetch unit configured to fetch program instructions from respective fetch addresses within said memory, each fetch address including a prediction selecting portion;

at least one history register configured to store a history value indicative of a pattern of preceding branch outcomes corresponding to whether a preceding sequence of branch instructions fetched from said memory respectively have taken or not taken branch outcomes;

a history buffer configured to store for each history value a plurality of prediction values giving predictions of branch outcomes for branch instructions preceded by a sequence of branch instructions corresponding to said history value and having respective prediction selecting portions; and a prediction values store configured to store a plurality of prediction values corresponding to a current value of said history value; wherein when said history value is changed, said prediction values store is configured to store said plurality of prediction values read from said history buffer; and when a potential branch instruction is fetched from a fetch address in said memory, prediction selection circuitry is configured to read from among said plurality of prediction values stored in said prediction values store one or more prediction values including a prediction value to be used for said potential branch instruction, said predicting value corresponding to a prediction selecting portion of said fetch address, such that if said history value does not change, then the prediction selection circuitry is configured to read prediction values for different potential branch instructions having different prediction selecting portions within their fetch addresses from said prediction values store without requiring a read from said history buffer.

2. Apparatus as claimed in claim 1, wherein said fetch addresses are X-bit addresses with bit positions extending from a lowest order bit 0 to a highest order bit (X−1), said instructions being fetched in blocks having a length of $2^N$ bytes and said fetch addresses including a low order bit portion extending from bit 0 to bit (N−1), a prediction selecting portion extending from bit N to bit M and a high order bit portion extending from bit (M+1) to bit (X−1).

3. Apparatus as claimed in claim 2, wherein N=3.

4. Apparatus as claimed in claim 2, wherein X=32.

5. Apparatus as claimed in claim 2, wherein M=4.

6. Apparatus as claimed in claim 1, comprising a prediction value selecting multiplexer switched by signals corresponding to said prediction selecting portion is configured to select said one or more prediction values from said prediction values store.

7. Apparatus as claimed in claim 1, wherein said history buffer is configured to store a plurality of prediction values for each history value, said plurality of predicted values being accessible in parallel in response to addressing of said history buffer by said history value for storing as said plurality of prediction values in said prediction values store.

8. A method of processing data under control of program instructions including branch instructions, said method comprising:

storing said program instructions in a memory;

fetching program instructions from respective fetch addresses within said memory, each fetch address including a prediction selecting portion;

storing at least one history value indicative of a pattern of preceding branch outcomes corresponding to whether a preceding sequence of branch instructions fetched from said memory respectively have taken or not taken branch outcomes;

in a history buffer, storing for each history value a plurality of prediction values giving predictions of branch outcomes for branch instructions preceded by a sequence of branch instructions corresponding to said history value and having respective prediction selecting portions; and in a prediction values store, storing a plurality of prediction values corresponding to a current value of said history value; wherein when said history value is changed, said plurality of prediction values are read from said history buffer and stored in said prediction values store; and when a potential branch instruction is fetched from a fetch address in said memory, one or more prediction values including a prediction value to be used for said potential branch instruction and corresponding to a prediction selecting portion of said fetch address is read from among said plurality of prediction values stored in said prediction values store such that if said history value does not change, then prediction values for different potential branch instructions having different prediction selecting portions within their fetch address are read from said prediction values store without requiring a read from said history buffer.

9. A method as claimed in claim 8, wherein said fetch addresses are X-bit addresses with bit positions extending from a lowest order bit 0 to a highest order bit (X−1), said instructions being fetched in blocks having a length of $2^N$ bytes and said fetch addresses including a low order bit portion extending from bit 0 to bit (N−1), a prediction selecting portion extending from bit N to bit M and a high order bit portion extending from bit (M+1) to bit (X−1).

10. A method as claimed in claim 9, wherein N=3.

11. A method as claimed in claim 9, wherein X=32.

12. A method as claimed in claim 9, wherein M=4.

13. A method as claimed in claim 8, comprising selecting said one or more prediction values including said prediction value to be used from said prediction values store using a prediction value selecting multiplexer switched by signals corresponding to said prediction selecting portion.

14. A method as claimed in claim 8, wherein said history buffer stores a plurality of prediction values for each history value said plurality of predicted values being accessed in parallel in response to addressing of said history buffer by said history value and stored as said plurality of prediction values in said prediction values store.

* * * * *